W. PEARSON.
FENDER.
APPLICATION FILED JUNE 18, 1915.

1,169,348.

Patented Jan. 25, 1916.
2 SHEETS—SHEET 1.

Witnesses:
C. Peinle, Jr.
R. M. Smith

Inventor
William Pearson.
By Victor J. Evans,
Attorney.

W. PEARSON.
FENDER.
APPLICATION FILED JUNE 18, 1915.

1,169,348.

Patented Jan. 25, 1916.
2 SHEETS—SHEET 2.

Witnesses:
C. Peinle, Jr.
R. M. Smith

Inventor,
William Pearson.
By Victor J. Evans,
Attorney.

UNITED STATES PATENT OFFICE.

WILLIAM PEARSON, OF SPOKANE, WASHINGTON.

FENDER.

1,169,348.   Specification of Letters Patent.   Patented Jan. 25, 1916.

Application filed June 18, 1915. Serial No. 34,926.

*To all whom it may concern:*

Be it known that I, WILLIAM PEARSON, a subject of the King of Sweden, residing at Spokane, in the county of Spokane and State of Washington, have invented new and useful Improvements in Fenders, of which the following is a specification.

This invention relates to fenders for automobiles, street cars and other vehicles, the broad object of the invention being to provide a fender pivotally connected with the vehicle and adapted to be automatically tripped by contact with a person or object, permitting the forward portion of the fender to drop into position to prevent such person or object coming into contact with the vehicle. The invention relates particularly to the means for supporting and tripping the body of the fender.

With the above and other objects in view, the invention consists in the novel construction, combination and arrangement of parts, as herein described, illustrated and claimed.

Figure 1:
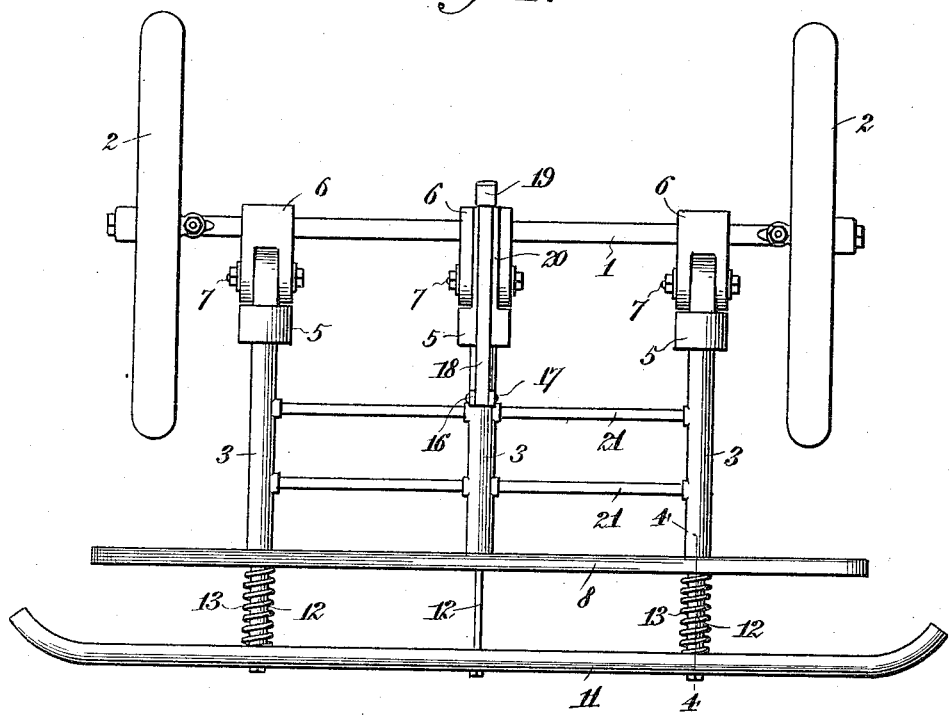
Figure 2:
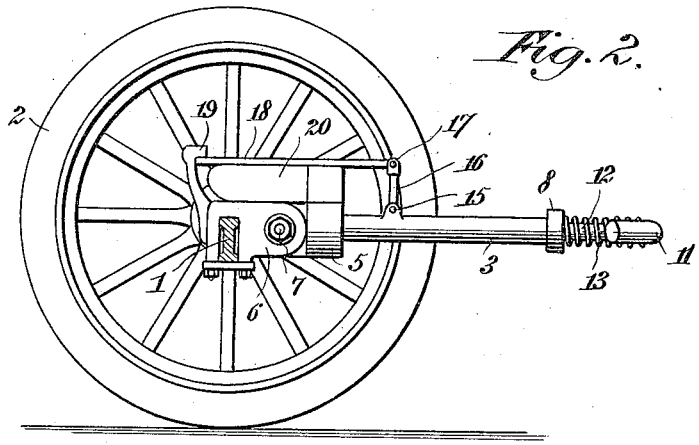
Figure 3:
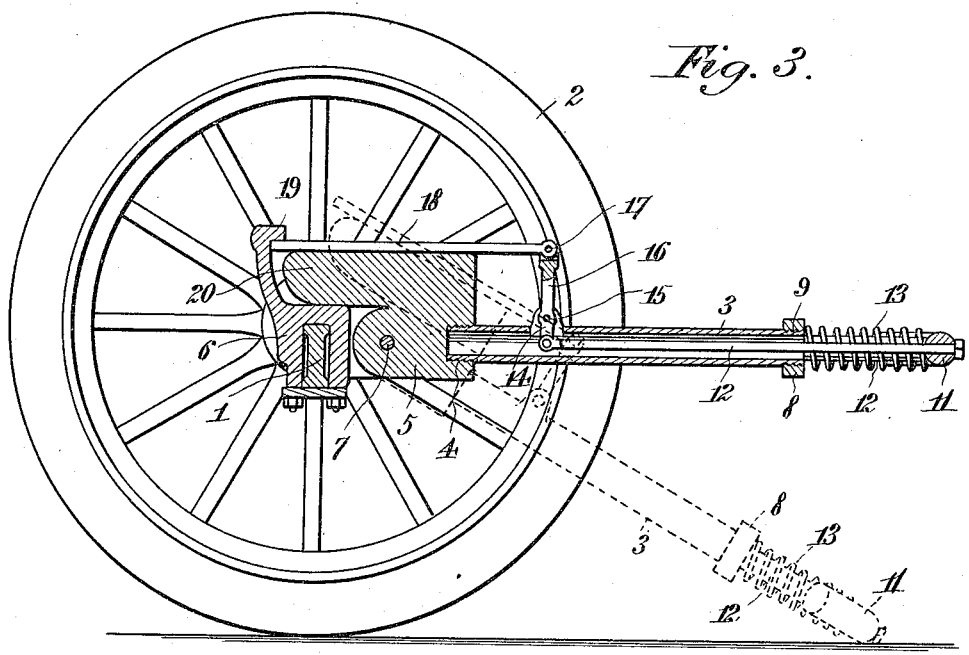
Figure 4:
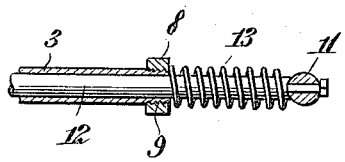

In the accompanying drawings:—Figure 1 is a plan view partly broken away illustrating the fender of this invention applied to the front axle of a vehicle. Fig. 2 is a side elevation of the same. Fig. 3 is a central vertical longitudinal section illustrating the fender in its raised position by full lines and in its lowered position by dotted lines. Fig. 4 is a fragmentary vertical longitudinal section on the line 4—4 of Fig. 1.

I have shown the fender of this invention as connected to the front axle of a vehicle, 1 designating such front axle and 2 the front wheels.

The fender comprises a plurality of substantially parallel tubular members 3 extending in a fore and aft direction and pivotally connected to the vehicle, each of the members 3 being shown as threaded at 4 and screwed into the movable member 5 of a knuckle joint, the stationary member 6 of which is secured in fixed relation to the axle 1.

7 designates the pivot connecting the two sections of the knuckle joint.

A yoke bar 8 extending perpendicularly to the tubular members 3 is provided at suitable points with internally threaded openings 9 into which the forward extremities of the tubular members 3 are tightly screwed.

Located in advance of the yoke bar 8 is a pilot or impact bar 11 substantially parallel to the yoke bar 8 and having rigidly connected therewith rearwardly extending guide rods 12 which are slidable through the openings in the yoke bar 8 and within the tubular members 3. Encircling some of the rods 12 are cushioning expansion springs 13 interposed between the bars 8 and 11 and acting to normally hold the bar 11 in spaced relation to the bar 8.

One of the rods 12, preferably the central rod, is arranged to coöperate with the lower arm 14 of a lever mounted on a horizontal axis 15, the other arm 16 of said lever having pivotally connected thereto at 17 a latch bar 18 one extremity of which is normally in engagement with an overhanging shoulder 19 when the fender is in its raised position. Underlying the latch bar 18 is a tail piece or extension 20 on the fender which is held down by the latch bar 18. When, however, the latch bar 18 is moved in a forward direction and is disengaged from the shoulder 19, the extension 20 is permitted to move upwardly on the knuckle joint 7, lifting the latch bar 18 to the position indicated by dotted lines in Fig. 3. Any desired number of cross bars or slats 21 may be employed, the same connecting the tubular members 3 and providing a slatted fender frame which will prevent a person or object from getting under the machine. Immediately a person or object is struck by the pilot or impact bar, the fender as a whole is released and dropped from its raised position to a point close to or in contact with the ground for the purpose set forth.

What I claim is:—

The combination with a wheeled vehicle, of a fender comprising parallel tubular members extending in a fore and aft direction and connected at their rear extremities by knuckle joints to the vehicle, a yoke bar extending at a right angle to the forward extremities of said tubular members which are fixedly secured thereto, said yoke bar being formed with guide openings in line with the bores of said tubular members, a pilot fender bar parallel to and in advance of said yoke bar, rods fixedly attached to said pilot bar and slidable through the yoke bar and within said tubular members, coiled expansion springs encircling said rods between the pilot bar and yoke bar, a trip lever in coöperative relation to one of said rods, a latch bar connected to and actuated by said lever, and a fixed latch shoulder with which said latch is held in engagement by the expansive action of said springs to support the fender in a raised position.

In testimony whereof I affix my signature in presence of two witnesses.

WILLIAM PEARSON.

Witnesses:
   STANLEY D. PRAGER,
   OLAF ANDERSON.

Copies of this patent may be obtained for five cents each, by addressing the "Commissioner of Patents, Washington, D. C."